(12) United States Patent
Lackner et al.

(10) Patent No.: US 6,447,742 B1
(45) Date of Patent: Sep. 10, 2002

(54) GAS CARBURIZING OF TUNGSTEN CARBIDE (WC) POWDER

(75) Inventors: Andreas Lackner, Reutte/Tirol; Andreas Filzwieser, Zeltweg, both of (AT)

(73) Assignee: Plansee Tizit Aktiengesellschaft, Tirol (AT)

( * ) Notice: Subject to any disclaimer, the term of this patent is extended or adjusted under 35 U.S.C. 154(b) by 0 days.

(21) Appl. No.: 09/461,493

(22) Filed: Dec. 14, 1999

(30) Foreign Application Priority Data

Dec. 28, 1998 (AT) .............................................. 863/98 U

(51) Int. Cl.⁷ ............................................... C01B 31/34
(52) U.S. Cl. ............................................... 423/440
(58) Field of Search ........................................ 423/440

(56) References Cited

U.S. PATENT DOCUMENTS

| | | | |
|---|---|---|---|
| 4,460,697 A | * | 7/1984 | Hara et al. .................. 423/440 |
| 5,372,797 A | | 12/1994 | Dunmead et al. ............ 423/440 |
| 5,919,428 A | * | 7/1999 | Gao et al. .................... 423/440 |

FOREIGN PATENT DOCUMENTS

| EP | 0 598 040 B1 | 7/1995 |
|---|---|---|
| WO | WO 97/16275 | 5/1997 |

* cited by examiner

Primary Examiner—Stuart L. Hendrickson
(74) Attorney, Agent, or Firm—Morgan & Finnegan, L.L.P.

(57) ABSTRACT

The invention concerns a gas carburizing method for production of fine-grained tungsten carbide (WC) powder in installations for fluidized bed reaction starting from free-flowing tungsten or tungsten oxide-containing powder with an average particle size $d_{50}>10$ μm in a single process step with a specific process temperature and process gas mixture with a carbon activity <1 and as close as possible to 1. The method is suitable for particularly economical WC production on an industrial scale.

7 Claims, 2 Drawing Sheets

GAS CARBURIZING OF TUNGSTEN CARBIDE (WC) POWDER

BACKGROUND OF THE INVENTION

1. Field of the Invention

The invention involves methods for production of fine-grain metal carbide powders and the resulting fine-grain powders and more particularly to tungsten carbide (WC) powder.

2. Background Information

Since the early days of industrial cemented carbide production, tungsten carbide (WC) powder has remained an important starting material. For decades tungsten oxide powder or powder of a tungsten oxide-containing compound has been filled into boats for its production, reduced under a reducing atmosphere for more than 10 hours to tungsten powder, the tungsten powder then mixed with carbon powder and again filled into a boat and made to react to tungsten carbide during a process lasting several hours by carbon diffusion into the tungsten grains. Tungsten carbide powder with particle size lower limits of a few $\mu$m diameter were produced according to the technically available particle sizes for the tungsten (W) metal obtained by reduction of the oxide.

With further development of improved cemented carbide grades over the past two decades and intensified demand for so-called submicron tungsten powder grades, gas carburizing methods have gained significance in addition to carburizing by carbon diffusion. As the name suggests, carburizing of tungsten in the gas carburizing method occurs by means of carbon transported via the gas phase to the tungsten surface. Methods are also known in which tungsten carburizing occurs both via solid carbon added to the tungsten powder and via carbon-containing gases. A significant reduction in process time and simplification of process control is expected with the application of the gas phase reaction, especially because undesired depositing of free carbon appears to be thermodynamically manageable via control and metering of the gas phase. It should also be expected that in the gas carburizing method, depending on the process temperature, particle enlargement in the already formed WC can be avoided or kept within tolerable limits. Particle enlargement in the already formed WC is unavoidable in the diffusion process as a result of longer process times.

Gas carburizing processes occur in a fluidized bed, ordinarily in rotary tube kilns or fluidized bed chambers. The corresponding installations operate continuously with respect to the product being carburized or in a sequence with stipulated filling amounts.

Coarse-grained dense tungsten carbide powder cannot be technically reduced or ground to powders with a particle size <1 $\mu$m. These are so-called submicron powders. It would therefore seem appropriate to arrive at submicron tungsten carbide powder using another technique. One such technique is by using submicron initial powders as the product being carburized via the gas carburizing process.

However, implementing a gas carburizing process for submicron WC powders is not easy. In fact, when the above ideas were implemented, a number of difficulties appeared that find expression in a large number of different proposals for process control.

Among the process developments for production of submicron or nanocrystalline tungsten carbide powder or WC—Co powder by gas carburizing, mostly two methods have been proposed, and will be further described below as representative with reference to U.S. Pat. No. 5,372,797 (the '797 patent) and European Pat. No. EP B 0 598 040 (the '040 patent).

A process for production of tungsten carbide with a particle size of 50 to 200 nm is described in the '797 patent. A solid tungsten-containing starting material is allowed to react in a flowing gas atmosphere containing hydrogen and molecular methane "until nearly all the tungsten starting material is converted to WC." The reaction occurs in two process sections, a first at 520° to about 550° C. and a second with a heating rate of 3° to 10° C. per min at about 800° to about 900° C. The temperature rise and partial pressure of the forming water is controlled so that "the mentioned powder particle size is produced." According to the main claim, at least 50% of the tungsten carbide with a particle size of 50 to 200 nm is to be formed during at least 15 min of reaction time in the second process section. The tungsten carbide so produced has a BET surface from 1 to 10 $m^2/g$, whereas the tungsten-containing starting material should possess a BET surface from 0.01 to 0.09 $m^2/g$, but at the same time commercial "GTE TO3" tungsten carbide powder with an average particle size of about 10 to 30 $\mu$m is described. According to Example 1 of the '797 patent, the reaction gas consists of 3% molecular methane and 97molecular hydrogen. The first partial reaction occurs after heating at a heating rate of 20° C. per min to 535° C. process temperature, the second reaction during a process temperature of 850° C. maintained for 90 min, which is controlled with a heating rate of 5° C.

According to individual preferred practical examples the process occurs in a horizontal kiln through which the product being carburized passes.

The entire process is controlled by precise monitoring of the weight change of the product being carburized in its partial processes. Following the reduction step, the W powder is essentially completely converted to $W_2C$ (see Example 1 of the 797 patent) before WC is formed in another partial process.

According to Example 2 of the '797 patent the tungsten carbide end product has a total carbon content of 6.13 wt % and the BET surface of the powder was determined at 4.0 $m^2/g$. A shortcoming in the mentioned process is that corresponding experiments were only conducted in a thermobalance unit or in an exceptional case with a mini-laboratory furnace with reaction amounts of up to 20 g. For lack of sufficient control, the critical process parameters of the '797 patent cannot be scaled up to commercial production. The very complex process control prescribed there, especially the exact temperature control and correlation with $H_2O$ partial pressure in the region of the product being carburized, cannot be economically transferred to equipment for industrial tungsten carbide production. For this reason, the method disclosed in the '797 patent is not technically feasible in ordinary charges of the product being carburized in ordinary industrial units.

The WC powders produced according to the '797 patent always contain undesired $W_2C$ powder fractions detectable in XRD recordings and generally undesired free carbon.

The '040 patent describes a carbothermic reaction process for production of nanophase metal/metal carbide particles, for example, WC—Co powder. The overall process is divided into three sections, a porous precursor particle being produced after step 1, which acts as substrate for penetration of carbon. In a second step carbon from a gas serving as the carbon source is allowed to penetrate the porous precursor particles at a carbon activity $a_c \geq 1.0$ and in a concluding step carbon and the gas serving as the carbon source are simultaneously made to react with the precursor powder particles so that at least one carbide phase is formed and the remaining unconverted carbon is eliminated by gasification with a second gas that can combine with carbon.

The porous precursor particles are produced according to the description in a demanding wet reaction from known tungsten oxide precursors, like $H_2WO_4$ or ammonium paratungstate by chemical dissolution and spray drying. Co(en)$_3WO_4$ or also AMT-Co—$Cl_2$ are such precursor materials. (en stands for ethylenediamine and AMT is an abbreviation for the costly ammonium metatungstate.)

The carburizing reaction preferably takes place in a fluidized bed. 700 to 850° C. is stated as process temperature. CO gas is used as process gas for the WC reaction, which automatically means a carbon activity $a_c>1$. To eliminate formed, unreacted free carbon after the actual WC carburizing process from the reaction zone, the process atmosphere is changed to a mixture of CO and $CO_2$ or $CO/H_2$, as well as $CH_4H_2$ with a carbon activity of about 0.5, which permits the conversion $C+CO_2$ to $2CO$. It is proposed as an alternative in the '040 patent that free carbon be added during preparation of the precursor material. According to evaluation by microstructural analysis, WC powder with a particle size between 30 and 100 nm is obtained.

In the process of the '040 patent, in the case of the WC—Co reaction the known effect that cobalt serves as catalyst for the process step is utilized.

A drawback in the '040 patent process is the demanding pretreatment of ordinary tungsten oxide-containing preliminary materials via salt solutions to a spray-dried precursor material containing porous tungsten and carbon. A metal/metal carbide mixture, for example, WC—Co, is exclusively produced, which is sometimes desired, but in other cases undesired. Because of the stipulated process control of carbon activities $a_c \leq 1$, and regularly much greater than 1, the desired conversion to WC and not to the undesired $W_2C$ only occurs at very high total carbon contents of about 20% or more. This again makes the time-consuming final treatment mentioned in the description with CO, $CO_2$ or $CO/H_2$ gas mixtures of low carbon activity ($a_c<1$) unavoidable in order to reactively bond and eliminate via the gas atmosphere free carbon unavoidably formed beforehand. In the first process section of WC formation, however, an $a_c>1$ is unavoidable for economic reasons, since at $a_v<1$ and because of a process temperature of about 800° C. (not to be surpassed for reasons of particle size stabilization), unacceptable process times of up to 20 h result.

In principle, a reaction temperature between 700° and 850° C. means long process times, even with restriction to metal/metal carbide mixture formation utilizing the aforementioned catalytic effect of the metal. The significant shortcomings of the '040 patent process are therefore the demanding preliminary material preparation and the overall long process time.

For executability of the above process, large-volume granulates must be formed from the fluidizable product being carburized, which in turn can only be ground with difficulty after WC conversion and can technically be deagglomerated at best unsatisfactorily to nanophase particles.

Accordingly, further processing of the WC—Co powder so obtained to useful submicron WC sintered carbide is only possible by applying grain growth inhibitors.

The WC particle size in sintered carbide ordinarily attainable lies at 0.6 to 0.8 $\mu$m.

Accordingly, processes are needed to provide tungsten carbide particle sizes and qualities and in the same range as available with sintered processes, but using more commercially viable gas carburization techniques.

SUMMARY OF THE INVENTION

In one aspect, the invention concerns a gas carburizing method for production of fine-grained WC powder, which has no foreign phases detectable in XRD analysis, with an average primary particle size $>0.2$ $\mu$m and $<5$ $\mu$m with a degree of carburizing $>96\%$ at a free carbon content $<0.1$ wt % in installations for fluidized bed reaction, preferably in a fluidized bed apparatus, starting from ungranulated free-flowing tungsten or tungsten oxide-containing powder with an average particle size $d_{50}>10$ $\mu$m as the product being carburized and from a carbon-containing process gas in the form of a $CO_x/H_2$ gas mixture with $X=1$ and/or 2, or a mixture of hydrocarbon gas and $H_2$, optionally with small amounts of water vapor.

The foregoing specific objects and advantages of the invention are illustrative of those which can be achieved by the present invention and are not intended to be exhaustive or limiting of the possible advantages that can be realized. Thus, the objects and advantages of this invention will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWING

The foregoing features and other aspects of the invention are explained in the following description taken in conjunction with the accompanying figures wherein.

It is understood that the drawings are for illustration only and are not limiting.

DETAILED DESCRIPTION OF THE INVENTION

The problem of the present invention is therefore to produce a pure tungsten carbide (WC) powder that can be processed to fine-grained submicron sintered carbide in a single process step, in which the process to be applied should not exhibit the drawbacks just outlined. For a comparatively simple, i.e., fluidized bed gas phase process manageable on a large industrial scale, demanding pretreatment of the product being carburized should also be eliminated, as should time-consuming and therefore costly subsequent reactions after the actual carburizing process to stabilize the pure tungsten carbide phase essential for sintered carbide production, which is free of fractions of undesired free carbon.

The process should be equally suited for the use of tungsten oxide-containing, powdered preliminary materials and for already reduced tungsten powder as the product being carburized.

The term "average particle diameter $d_{50}$" used in the specification and the claims is the particle diameter to which 50% of the particle size density distribution corresponds in a laser granulometry measurement (wet method).

The term "average primary particle size" used in the specification and the claims and referred to the formed WC, is understood to mean the WC individual particle size that a fully deagglomerated WC powder has and which is determined on average both optically in a scanning electron photomicrograph (SEM) at 20,000-fold magnification and is also covered with the value according to the $d_{50}$ definition.

The degree of carburizing used in the specification and the claims is the percentage in which a 100% degree of carburizing corresponds to the stoichiometric amount of 6.13 wt % $C_{total}$ in WC.

The term "XRD analysis" used in the specification and the claims refers to x-ray diffraction analysis.

The term "tungsten oxide-containing" powder used in the specification and the claims is understood to mean all prematerials ordinarily used for the reduction step, like ammonium paratungstate and tungstic acid, in addition to pure $WO_3$ and WBO (blue tungstic oxide).

The process which can be conducted in a single process step embraces different chemical reactions depending on whether a tungsten oxide-containing powder is initially fully reduced to W and then carburized to WC or must be carburized to WC starting from W metal powder.

In addition to the W powder grades available on the market, the use of W powder produced according to a method according to EP A1 0 808 227 yielded excellent WC quality.

Figure 2:
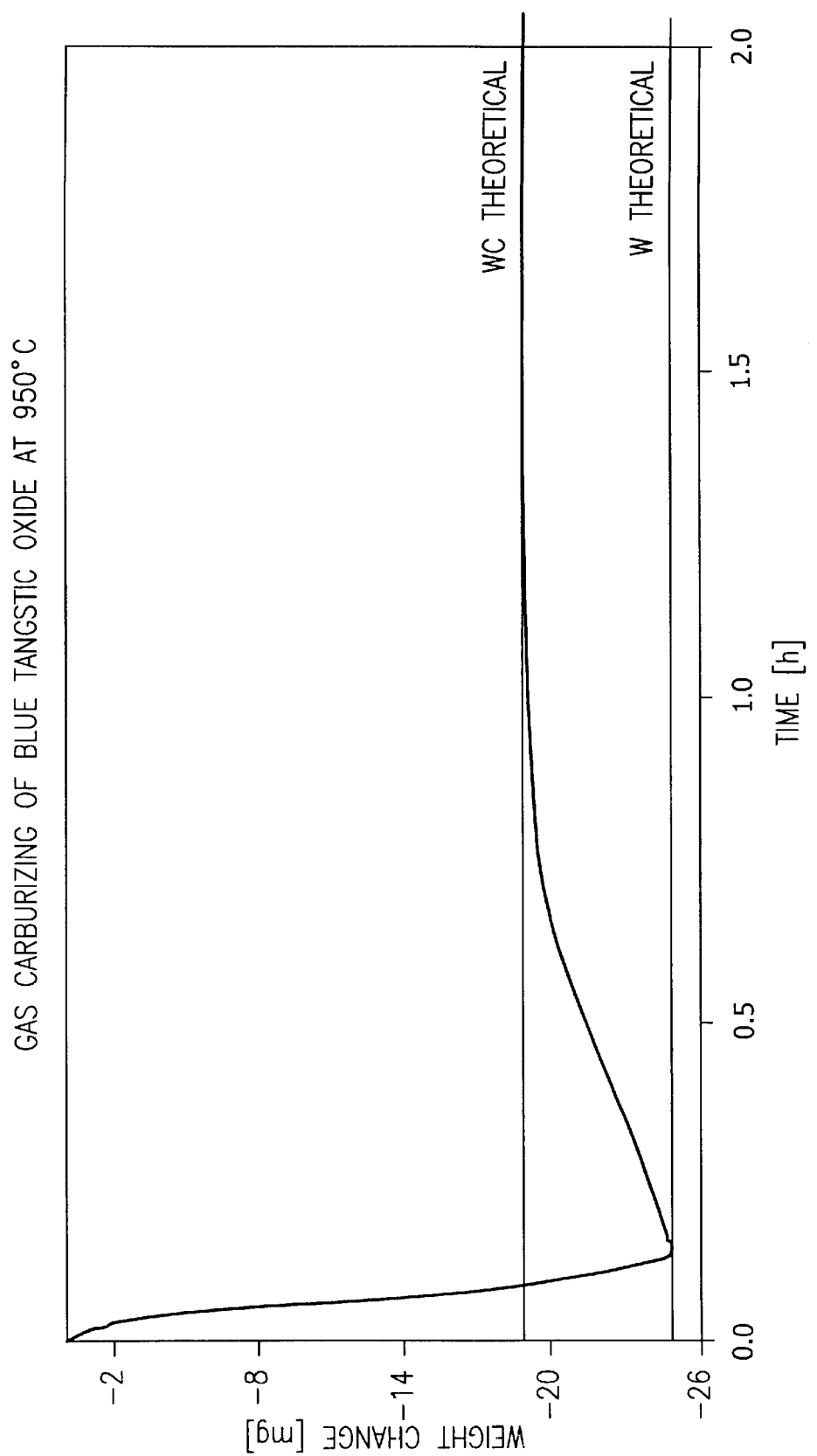
FIG. 2 illustrates results of blue tungstic oxide gas carburizing at 950° C. according to one embodiment of the invention.

In the later described FIG. 2 it is convincingly demonstrated that the carburizing process also occurs via the intermediate $W_2C$, which, however, according to the process of the invention, in contrast to the cited prior art, is not made to react further in a first step almost completely to $W_2C$ and this then to WC, but instead formation of $W_2C$ and further reaction to WC occur simultaneously and parallel during the entire process time.

For the case when the single process step begins with reduction of tungsten oxide-containing powders, a small amount of water vapor of less than 5 vol % referred to the total process gas is advantageously added during the reduction phase to the process gas flowing into the reaction chamber after achievement of the process temperature.

With performance of the process in a single process step, a back reaction of already formed W powder to oxide powder can be effectively prevented.

Among the gas carburizing reactions in a fluidized bed, the fluidized bed method in a fluidized bed apparatus and the rotary tube kiln method have found the broadest application.

The powdered product being carburized, depending on the installation type, can continuously migrate through an apparatus or be treated batchwise in succession in a closed single process step.

During the heating and cooling period before and after the actual process, the installation is regularly exposed to a flowing inert gas. The process gas is first admitted on achievement of the process temperature. It flows through the installation, is freed of unusable reaction products after emerging, is readjusted to the stipulated process gas mixture and finally fed back to the process.

The degree of carburization for the reaction to WC is stated with a lower limit of >96%, but regularly reaches 98 to 99.5% in practice. The content of free carbon $C_{free}$ is stated with a limiting value of <0.1 wt %. In practical experiments 0.01 wt % and less have often been reached.

The process time, the residence time of the product being carburized at the process temperature and in the presence of the flowing process gas depends on the charge thickness or fluidized bed height of the product being carburized in the fluidized bed. It has proven advantageous and feasible to keep the process time in the case of the process temperature according to the invention at less than 60 min if W powder is the product being carburized.

The advantageous process time is less than 100 min when tungsten oxide-containing powder is the product being carburized.

A major advantage of the present invention over the method according to prior art is the industrial applicability of the process using available types of equipment with comparatively more economical produceability of tungsten carbide powder of high quality. The tungsten carbide powder produced according to the present process, measured in process cost, leads to good sintered carbide quality not foreseeable to this extent with very uniform submicron particle size at high strength and high toughness. One reason for the good processability of the tungsten carbide powder so produced and the good sintered carbide quality achieved with it is the good grindability and deagglomerability of the tungsten carbide caused by the highly porous macrostructure within an individual grain. The WC produced according to the present process is readily processable to compacts.

The economic advantages of the process according to the invention relative to the known prior art are apparent from the fact that the product being carburized need not be subjected to demanding and costly pretreatment. Economic efficiency, in the second place, is obtained from a surprising, unforeseeable short total process time in a single process step with unexpectedly high process yield of pure tungsten carbide powder.

The comparatively short process time in the present process was surprising to one skilled in the art, because a coarse but fluidizable and readily free-flowing powder grain is started from the product being carburized, whereas the finest possible submicron powders are used in the known process, which are then converted to macroscopically large powder grains, optionally by special granulation methods. Moreover, it was not foreseeable to one skilled in the art that high process efficiency would actually be achieved based on the combination of process conditions according to the inventive process. The processes according to the prior art exhibit either low process efficiency, i.e., different undesired byproducts or unreacted starting products are obtained in addition to the desired end product tungsten carbide, which then must be processed in a repeated circuit, or individual pre- and/or final treatments must be connected to the actual carburizing process in order to first permit the desired carbide reaction in an acceptable process time and avoid or reduce interfering secondary reaction products.

The present invention with respect to the combination of process conditions according to the invention is determined from the surprising finding that the conventional, previously used principles known to one skilled in the art do not lead to the objective, which principle is the use of as much carbon as possible for a carburizing reaction at carbon activity $a_c$ well above 1. The finding was to apply carbon free of carbon surplus and $a_c<1$, so that according to the present invention an abruptly higher economic efficiency of the carburizing process is obtained with a simultaneously unexpectedly high quality of the tungsten carbide and the tungsten carbide-cobalt sintered product.

The actually desired particle size within the claimed WC particle size range of >0.2 and <5 $\mu$m can be produced within very small particle size ranges by control and monitoring of the essential process parameters according to the invention.

The invention is further explained below with reference to examples. However, it is not restricted to the mentioned practical examples. The examples largely cover the feature range according to the invention and offer a comparison with the methods described according to the prior art.

With reference to individual examples, the fact that the process according to the invention is tested on a laboratory scale (thermobalance) but is also equally transferable to an industrial scale without quality loss is assigned special significance.

EXAMPLE 1

Figure 1:
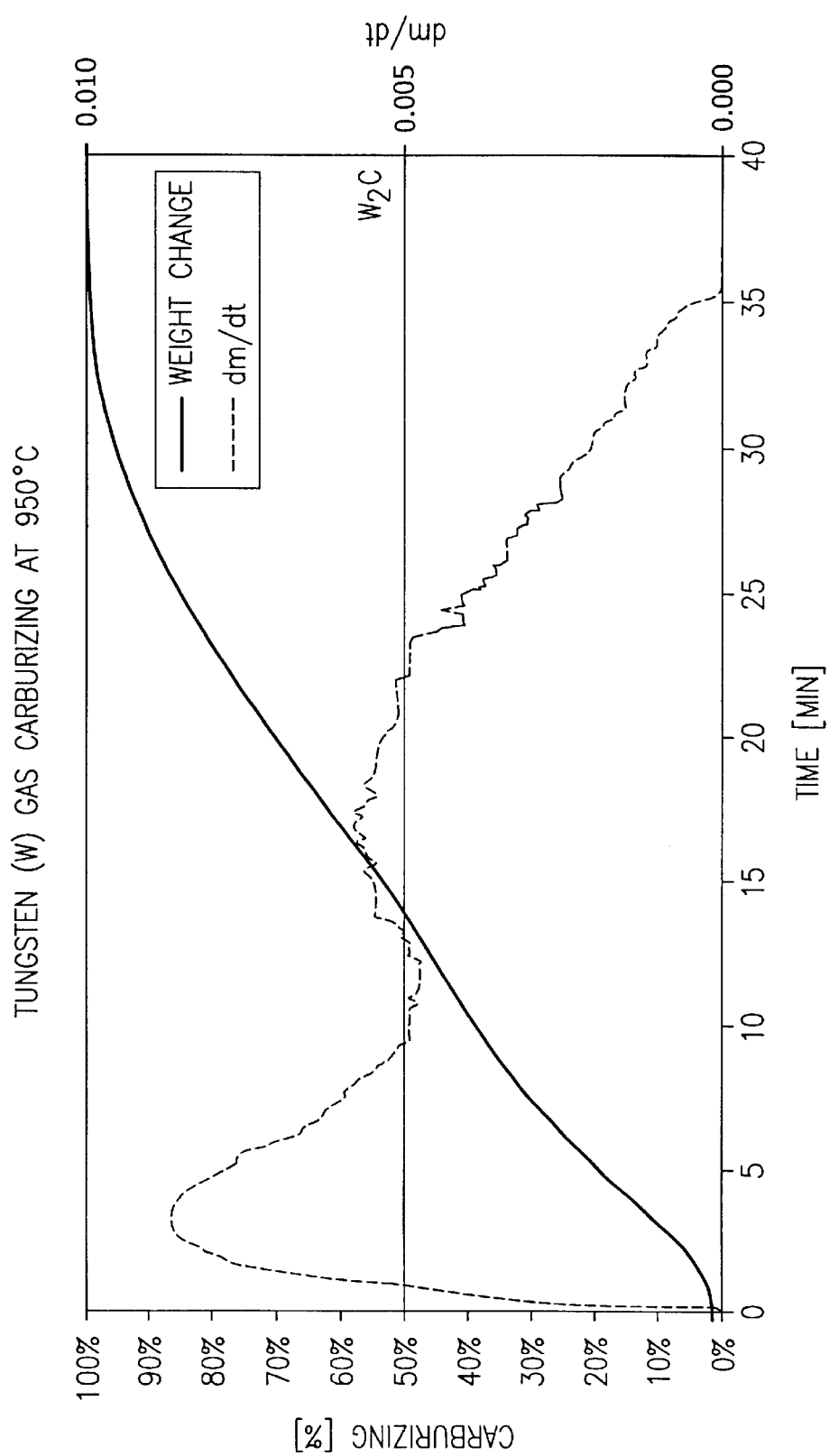
FIG. 1 illustrates results of tungsten gas carburizing at 950° C. over time according to one embodiment of the invention.

A sample amount of W metal powder produced according to the process in EP A1 0 808 227 ($d_{50}$=35 µm (determined by laser granulometry), BET=2.16 m²/g) of 100 mg was uniformly distributed in a dish (diameter 16 mm) and heated to the isothermal experiment temperature of 950° C. in a CAHN thermogravimetry unit/thermobalance (TGA) (Model TG-171) under an inert gas (Ar) with a flow rate of 6 L/h as quickly as possible (for example, 25° C./min). A switch was then made to the process gas mixture ($a_c$<1) 40% CO/60% $H_2$ (total flow rate: 6 L/h) and the weight increase recorded. As is apparent in FIG. 1, after about 35 min, the end of the reaction is reached at a degree of carburizing of 98.7% (±1%), in which the total experiment is ended after 2.5 h without additional weight increase and therefore without $C_{free}$ increase and then cooled for 3 h to room temperature. As is apparent from the derivative of the TGA curve in FIG. 1, a change in rate of carburizing is apparent at precisely the 50% degree of carburizing, but only partial conversion to $W_2C$ occurs, with simultaneous further reaction to WC, as the constant weight increase shows. An XRD analysis showed pure WC at 20,000-fold magnification with an average WC primary particle size (microstructure) in the sponge-structured macrostructure of 0.25 µm.

EXAMPLE 2

Experimental procedure and charge material as in Example 1. After heating to 950° C., a switch to the process gas mixture was made ($a_c$<1, but closer to 1 than in Example 1) 60% CO/40% $H_2$ (total flow rate: 6 L/h) and the weight increase recorded. The end of the reaction was reached already after less than 20 min. The degree of carburizing determined from TGA is 98.6%. This experiment was also completed without $C_{free}$ formation. XRD analysis showed pure WC without traces of $W_2C$ or W. Carbon analysis (LECO) gave 6.10% $C_{total}$ and <0.01% $C_{free}$. An SEM photomicrograph at 20,000-fold magnification showed an average WC primary particle size (microstructure) of 0.26 µm in the sponge-structured macrostructure.

EXAMPLE 3

Experimental procedure and charge material as in Example 1, but in contrast to Example 1 and to the invention, a process gas mixture of a >1 was used. After heating to 950° C., a switch was made to the process gas mixture ($a_c$>1) 99% CO/1% $H_2$ (total flow rate: 6 L/h) and the weight increase recorded. After 55 min 100% degree of carburizing was surpassed and a constant weight increase, attributed to formation of $C_{free}$, was recorded up to interruption of the experiment after 15 h. The degree of carburizing determined from TGA is 109.8%. XRD analysis did show pure WC without traces of $W_2C$ or W, but the carbon analysis (LECO) gave 6.84% $C_{total}$ and >0.6% $C_{free}$.

EXAMPLE 4

Experimental procedure as in Example 1, but standard W 0.6 µm (Fischer subsieve size=0.62 µm, $d_{50}$=0.46 µm determined by laser granulometry) and thus a particle size outside of the range according to the invention we used as starting material. The process temperature and gas composition were chosen as in Example 1. The end of the reaction was reached after 60 min. The degree of carburizing determined from TGA was 98.3%. This experiment, which lasted almost twice as long as the comparison (see Example 1), however, because of the coarser W structure (absence of porosity in the microstructure of the W metal) was ended without recording $C_{free}$. XRD analysis showed pure WC without traces of $W_2C$ or W. Carbon analysis (LECO) gave 6.04% $C_{total}$ and <0.01% $C_{free}$. An SEM photomicrograph at 20,000-fold magnification showed an average WC primary particle size (microstructure) of 0.6 µm in the sponge-structured macrostructure.

EXAMPLE 5

Experimental procedure as in Example 1, but standard W 5.5 µm (Fischer subsieve size=5.6 µm, $d_{50}$=6.1 µm determined by laser granulometry) and therefore a particle size outside of the range according to the invention was used as starting material. The process temperature and gas composition was chosen as in Example 1. The end of the reaction was not waited for, but the experiment interrupted after 15 h. The degree of carburizing determined by TGA is 37.3%. XRD analysis gave WC and W. Carbon analysis (LECO) gave 2.5% $C_{total}$ and <0.01% $C_{free}$ which corresponds to a degree of carburizing of 40.9%.

EXAMPLE 6

Experimental procedure and charge material as in Example 1, but other than in the invention, 10 mg superfine Co (standard quality Co "UMEX 0.9 Ultrafine" from Union Miniere) according to EP 0 598 040 was added to the initial material. In the recorded weight increase it was found that because of the catalytic effect the carburizing reaction reached a degree of carburizing at 50% more quickly (i.e., conversion to $W_2C$ is catalyzed) and then further carburizing did not occur for about 20 min until the entire amount of employed W had been converted to $W_2C$. The total carburizing to WC lasted 270 min owing to the extremely slow conversion of $W_2C$ to WC as is known to one skilled in the art.

EXAMPLE 7

Experimental procedure and charge material as in Example 1, but in a first step of process upscaling, 6,042 mg sample amount in a ceramic crucible was used instead of 100 mg. After heating to 950° C., a switch was made to the process gas mixture ($a_c$<1) 40% CO/60% $H_2$ (total flow rate: 6 L/h) and the weight increase recorded. The end of the reaction was reached after 1000 min. The degree of carburizing determined from TGA is 98.5%. This experiment was also ended without $C_{free}$ absorption. The reaction mechanism including the time derivative of the TGA curve, despite the 60-fold weight loading in comparison with Example 1 (effect of height of the powder charge) showed no change relative to Example 1. XRD analysis showed pure WC without traces of $W_2C$ or W. Carbon analysis (LECO) gave 6.05% $C_{total}$ and <0.01% $C_{free}$. An SEM photomicrograph at 20,000-fold magnification showed an average WC primary particle size (microstructure) of 0.29 µm in the sponge-structured macrostructure.

EXAMPLE 8

Experimental procedure as in Example 1, but 125 mg of blue tungstic oxide ($d_{50}$=54.6 µm determined by laser granulometry; residue: $NH_3$=645 ppm, $O_2$ content=19.5%) was used instead of W metal. After heating to 950° C. a switch was made to the process gas mixture ($a_c$<1) 40% CO/60% $H_2$ (total flow rate: 6 L/h) and the weight increase or reduction recorded. Complete reduction to W metal was first recorded after about 0.14 h and a subsequent constant carburizing to WC reaction end after 1.5 h (degree of carburizing >96%) (see FIG. 2; dm/dt=weight change per unit time). This experiment was also ended without $C_{free}$ absorption. The reaction mechanism, including the time derivative of the TGA curve showed no change relative to Example 1, apart from the complete reduction to W metal before the directly linked carburizing. XRD analysis showed pure WC without traces of $W_2C$ or W. Carbon analysis (LECO) gave 6.02% $C_{total}$ and <0.01% $C_{free}$. An SEM photomicrograph at 20,000-fold magnification showed an average WC primary particle size (microstructure) of about 0.6 $\mu$m in the sponge-structured WC macrostructure.

EXAMPLE 9

Experimental procedure as in Example 8, but 125 mg blue tungstic oxide ($d_{50}$=51.3 $\mu$m determined by laser granulometry; residue: $NH_3$=1240 ppm, $O_2$ content=19.45%) was used as starting material. After heating to 1050° C. a switch was made to the process gas mixture ($a_c$<1) 40% CO/60% $H_2$ (total flow rate: 6 L/h) and the weight increase or reduction recorded. A complete reduction to W metal was first recorded after about 0.087 h and a subsequent constant carburizing to WC reaction end after 1.9 h. This experiment was also ended without $C_{free}$ absorption. XRD analysis showed pure WC without traces of $W_2C$ or W. Carbon analysis (LECO) gave 6.12% $C_{total}$ and <0.01% $C_{free}$. An SEM photomicrograph at 20,000-fold magnification showed an average WC primary particle size (microstructure) of about 0.75 $\mu$m in the sponge-structured WC macrostructure.

EXAMPLE 10

Experimental procedure and starting material as in Example 8, but an altered process gas was used. After heating to 950° C. a switch was made to the process gas mixture ($a_c$<1) 1.15% $CH_4$/98.85% $H_2$ (total flow rate: 6 L/h) and the weight increase or reduction recorded. Complete reduction to W metal was first recorded after about 0.35 h and a subsequent constant carburizing to WC reaction end after 3.9 h. This experiment was also ended without $C_{free}$ absorption. An XRD analysis gave WC. A carbon analysis (LECO) gave 6.01% $C_{total}$ and <0.03% $C_{free}$. An SEM photomicrograph at 20,000-fold magnification showed an average WC primary particle size (microstructure) of about 0.55 $\mu$m in the sponge-structured WC macrostructure.

EXAMPLE 11

Starting material as in Example 1, but on a pilot scale significantly closer to industrial scale a powder amount of 1.6 kg was used, which was charged to a fluidized bed reactor with a 10 cm diameter. The material was fluidized with Ar (7 L/min) and then heated from room temperature to 980° C. in 20 min. A switch was made to the process gas mixture 40% CO/60% $H_2$ as fluidizing and reaction gas at the process temperature of 980° C. After 5 h of reaction time the reactor was cooled during fluidization under Ar (7 L/min) to room temperature. XRD analysis showed pure WC without traces of $W_2C$ or W. An SEM photomicrograph at 20,000-fold magnification showed an average WC primary particle size (microstructure) of about 0.3–0.4 $\mu$m in the sponge-structured WC macrostructure.

EXAMPLES 12 and 13

The process conditions and fluidized bed reactor were chosen as in Example 11, but the starting material according to Example 4 was used for Example 12 and the starting material according to Example 5 was used for Example 13 and therefore a starting material with a particle size outside of the range according to the invention. After major difficulties in achieving fluidization of these materials without skein formation and "lift off" (clocking of the fluidized bed), the experiment had to be interrupted during switching to the process gas because of lack of fluidization (even with a mechanical agitator that can be used to support fluidization in charge materials that are difficult to fluidize, as known to one skilled in the art).

EXAMPLE 14

Starting material chosen as in Example 8, but a pilot plant scale much closer to industrial scale was used with a powder amount of 8.6 kg which was charged to a fluidized bed reactor with a diameter of 15 cm.

The material was fluidized with $N_2$ (6.1 m/min) and then heated from room temperature to 990° C. in 30 min. After switching to process gas 40% CO/59% $H_2$ and 1% $H_2O$ and a total reaction time of 6 h and subsequent cooling to room temperature in 2 h, XRD analysis showed pure WC without traces of $W_2C$ or W. An SEM photomicrograph at 20,000-fold magnification showed an average WC primary particle size (microstructure) of about 0.6 $\mu$m in the sponge-structured WC macrostructure.

EXAMPLE 15

WC powder from Example 14 was deagglomerated in standard fashion in a jet mill (AFG 100 from Alpine Hosakawa, Germany). The porous macrostructure was then destroyed and deagglomerated to WC primary grain sizes visible from SEM photomicrographs. Particle size distribution determined by laser granulometry gave a $d_{50}$ of 0.63 $\mu$m. The deagglomerated WC powder was mixed with 6% Co (standard quality Co "MEX 0.9 Ultrafine" from Union Miniere) and a usually added amount of grain growth inhibitor (0.5% VC) and ground in an attritor with WC—Co spheres 4 mm in diameter in acetone for 5 h at 300 rpm. After drying and screening, standard disposable insert samples were pressed and then sintered.

|  | Density ($g/cm^3$) | Coercive force HC (Oe) | 4 Pi Sigma ($10^{-7}$ $Tm^3$/kg) | Hardness HV30 ($daN/mm^2$) | Porosity |
| --- | --- | --- | --- | --- | --- |
| Example 15 | 14.78 | 471 | 112 | 2031 | <A02; B00; |
| Standard grades using a commercial WC 0.6 $\mu$m | 14.8 | 480 | 115 | 2020 | <A02; B00 |

It is apparent from the above table that a WC powder produced according to this method for sintered carbide is comparable to a conventionally produced submicron powder.

Although illustrative embodiments have been described herein in detail, it should be noted and will be appreciated by those skilled in the art that numerous variations may be made within the scope of this invention without departing from the principle of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A gas carburizing method for production of fine-grained tungsten carbide (WC) powder that exhibits no foreign phases detectable in X-ray diffraction analysis having an average primary particle size >0.2 $\mu$m and <5 $\mu$m with a degree of carburizing >96% at a free carbon content <0.1 wt % in a fluidized bed unit, starting from coarse, free-flowing powder containing tungsten or tungsten oxide having an average particle size $d_{50}$>10 $\mu$m as a material being carburized and carbon-containing process gas comprising either a $CO_x/H_2$ gas mixture wherein X=1 or 2, or a mixture of a hydrocarbon gas and $H_2$, and 0–5 volume percent water vapor, wherein the material being carburized is brought in a single process step with an ordinary heating rate between 1° and 50° C. per min under a protective gas continuously to a constant process temperature of >900° C. to 1200° C., wherein the supplied process gas comprises either at least 10 vol % $CO_x$, or 0.1 to 5 vol % hydrocarbon gas, remainder $H_2$ and water vapor, and wherein, during a process time at the process temperature, a carbon activity is <1 and is as close as possible to 1 in the process gas in a process reaction zone of the unit.

2. A method for production of fine-grain tungsten carbide (WC) powder according to claim 1 wherein the process gas flows through a fluidized bed reaction chamber and then through an exhaust gas purification process before being fed back to the reaction chamber.

3. A method for production of fine-grain tungsten carbide (WC) powder according to claim 1, wherein the material being carburized comprises tungsten powder, the process time is less than 4 hours, and the process temperature is about 1000° C.

4. A method for production of fine-grain tungsten carbide (WC) powder according to claim 1, wherein the material being carburized comprises blue tungstic oxide, the process time is less than 5 hours, and the process temperature is about 1000 deg. C.

5. A method for production of fine-grain tungsten carbide (WC) powder according to claim 1, wherein the material being carburized comprises tungsten powder, the process temperature is 920 to 950 deg. C., and the process gas comprises a mixture of $H_2$ and 20 to 40 vol % CO.

6. A method for production of fine-grain tungsten carbide (WC) powder according to claim 1, wherein the material being carburized comprises blue tungstic oxide, the process temperature is 950 deg. to 1000 deg. C., and the process gas comprises a mixture of $H_2$ and 2 to 4 vol % $CH_4$, and wherein 3 vol % $H_2O$ is added during an initial reduction period.

7. A fine-grain tungsten carbide (WC) powder produced according to the method of one of claims 1, 2, 3, 4, 5, or 6, wherein the average particle size of the tungsten carbide is 0.3 to 0.8 $\mu$m and the tungsten carbide grain has a sponge structured WC macrostructure.

* * * * *